US011393004B2

(12) United States Patent
Hearnes, II et al.

(10) Patent No.: US 11,393,004 B2
(45) Date of Patent: Jul. 19, 2022

(54) SYSTEMS AND METHODS FOR IDENTIFYING SUSPICIOUS ORDERS

(71) Applicant: United Parcel Service of America, Inc., Atlanta, GA (US)

(72) Inventors: Warren Eastman Hearnes, II, Lilburn, GA (US); Lester Robert Lamb, New Castle, DE (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 139 days.

(21) Appl. No.: 16/443,667

(22) Filed: Jun. 17, 2019

(65) Prior Publication Data
US 2019/0303986 A1    Oct. 3, 2019

Related U.S. Application Data

(63) Continuation of application No. 13/737,489, filed on Jan. 9, 2013, now Pat. No. 10,325,300, which is a
(Continued)

(51) Int. Cl.
*G06Q 30/06* (2012.01)
*G06Q 10/08* (2012.01)
*G06F 16/955* (2019.01)

(52) U.S. Cl.
CPC ....... *G06Q 30/0607* (2013.01); *G06F 16/955* (2019.01); *G06F 16/9566* (2019.01); *G06Q 10/0838* (2013.01); *G06Q 30/06* (2013.01)

(58) Field of Classification Search
CPC .......... G06F 17/30876; G06Q 30/0607; G06Q 30/0609; G06Q 30/06; G06Q 10/0838;
(Continued)

(56) References Cited

U.S. PATENT DOCUMENTS 7,318,043 B1    1/2008  Silver et al.
8,386,277 B2    2/2013  Hearne et al.
(Continued)

FOREIGN PATENT DOCUMENTS

CN    1545668 A    11/2004

OTHER PUBLICATIONS

Fighting Diversion: "The Cardinal Health Suspicious Order Monitoring Program", Internet Archive Available Online at <http://web.archive.org/... 3/http://www.cardinalhealth,com/us/en/solutions/medication-safety/manufacturer-store/fighting-diversion>, Aug. 29, 2008, 2 pages.
(Continued)

*Primary Examiner* — Igor N Borissov
(74) *Attorney, Agent, or Firm* — Shook, Hardy & Bacon L.L.P.

(57) ABSTRACT

Various embodiments of the present invention generally relate to systems and methods for identifying suspicious orders for controlled substances based on performing checks on a received order using historical information on previous orders. According to various embodiments, these checks may include: (1) comparing the order quantity for the received order with the order quantity history for the customer who placed the order for the controlled substance; (2) comparing the order quantity and the days since the last order was shipped to the customer for the same controlled substance with the order quantity history and the days between orders for the particular customer and controlled substance; (3) comparing the order quantity with order quantity history for orders received by customers of the same type for the controlled substance; and (4) comparing the order quantity with order quantity history for any customer for the particular controlled substance.

18 Claims, 9 Drawing Sheets

Related U.S. Application Data continuation of application No. 12/729,543, filed on Mar. 23, 2010, now Pat. No. 8,386,277.

(58) Field of Classification Search
CPC .... G06Q 50/22; G06Q 50/24; G06Q 30/0635; G06Q 30/0641; G06Q 30/0637; G06Q 30/0633
USPC ..... 705/26.25, 26.8, 26.81, 26.82, 330, 341, 705/342, 2–4
See application file for complete search history.

(56) References Cited

U.S. PATENT DOCUMENTS

| | | |
|---|---|---|
| 2004/0176985 A1 | 9/2004 | Lilly et al. |
| 2005/0108063 A1 | 5/2005 | Madill et al. |
| 2005/0108102 A1 | 5/2005 | York |
| 2006/0136301 A1 | 6/2006 | Grovit |
| 2008/0004966 A1 | 1/2008 | Singleton et al. |
| 2010/0030653 A1 | 2/2010 | Westphal |
| 2011/0238593 A1 | 9/2011 | Hearnes et al. |
| 2013/0124363 A1 | 5/2013 | Hearnes et al. |

OTHER PUBLICATIONS

Cardinal Health Builds Out its "Suspicious Order Monitoring Program", Settlement with DEA Results in a Top-to-Bottom Overhaul of Controlled-Substances Handling, Available Online at:<http://pharmaceuticalcommerce.com/frontEnd/main,php?idSectino=972>, Aug. 10, 2008, 1 page.

Chemical Program: "Knowing Your Customer/Suspicious Orders Reporting", Office of Diversion Control, Available Online at:<https://www.deadiversion.usdoj.gov/chem_prog/susp.htm>, Jul. 1, 2010, 4 page.

Extended European Search Report received for European Patent Application No. 10784919.2, dated Aug. 23, 2013, 7 pages.

Final Office Action received for U.S. Appl. No. 13/737,489, dated Apr. 19, 2016, 13 pages.

Final Office Action received for U.S. Appl. No. 13/737,489, dated Jun. 17, 2016, 19 pages.

Final Office Action received for U.S. Appl. No. 13/737,489, dated May 20, 2015, , 7 pages.

International Preliminary Report on Patentability received for PCT Patent Application No. PCT/US2010/057322, dated May 8, 2012, 4 pages.

International Search Report and Written Opinion received for PCT Patent Application No. PCT/US2010/057322, dated Sep. 12, 2011, 8 pages.

Non-Final Office Action received for U.S. Appl. No. 13/737,489, dated Dec. 15, 2015, 9 pages.

Non-Final Office Action received for U.S. Appl. No. 13/737,489, dated Jun. 14, 2018, 26 pages.

Non-Final Office Action received for U.S. Appl. No. 13/737,489, dated Feb. 26, 2015, 11 pages.

Notice of Allowance received for U.S. Appl. No. 13/737,489, dated Feb. 4, 2019, 7 pages.

Office Action received for Canadian Patent Application No. 2,787,100, dated Jul. 16, 2015, 7 pages.

Office Action received for Chinese Patent Application No. 201080065218.5, dated Sep. 16, 2014, 16 pages.

Office Action received for European Patent Application No. 10784919.2, dated Feb. 4, 2014, 4 pages.

Office Action received for Mexican Patent Application No. MX/A/2012/010942, dated Jul. 10, 2013, 6 pages.

Office Action received for Mexican Patent Application No. MX/A/2012/010942, dated May 24, 2013, 7 pages.

Summons to Attend Oral Proceedings received for European Patent Application No. 10784919.2, mailed on May 16, 2017, 7 pages.

"Suspicious Order Monitoring", Cegedim Dendrite, Available Online at:<http://cegedimdendrite.com/regions/americas/En/RegulatoryCompliance/RegulatoryCompliance>, Jul. 1, 2010, 1 page.

"The Cardinal Health Suspicious Order Monitoring Program", Cardinal Health, Fighting Diversion Available Online at:<https://www.cardinalhealth.com/en/solutions/midication-safety/manufacturer-store/fighting-diversion, Jul. 1, 2010, 1 page.

Final Office Action received for U.S. Appl. No. 12/729,543, dated Jun. 6, 2012, 11 pages.

Non-Final Office Action received for U.S. Appl. No. 12/729,543, dated Feb. 28, 2012, 12 pages.

Notice of Allowance received for U.S. Appl. No. 12/729,543, dated Dec. 3, 2012, 7 pages.

SYSTEMS AND METHODS FOR IDENTIFYING SUSPICIOUS ORDERS

CROSS-REFERENCE TO RELATED APPLICATIONS

This application is a continuation application of and claims priority to and the benefit of U.S. application Ser. No. 13/737,489 filed Jan. 9, 2013, which itself is a continuation of U.S. application Ser. No. 12/729,543, filed Mar. 23, 2010, the entire contents of each of the foregoing applications being hereby incorporated by reference herein.

BACKGROUND OF THE INVENTION

Field of the Invention

Various embodiments of the disclosed invention generally relate to systems and methods for identifying suspicious orders for controlled substances, and more specifically, to systems and methods for identifying suspicious orders for controlled substances based on performing checks on a received order using historical information on previous orders.

Description of the Related Art

In the United States, distributors of controlled substances are required to be registered by the Drug Enforcement Administration (DEA). A controlled substance is generally understood to be a drug or chemical substance whose possession and use are regulated under the United States' Controlled Substances Act, such as, for instance, many prescription medications and narcotic drugs. Under federal regulations, a distributor must design and operate a system to disclose suspicious orders of controlled substances. Suspicious orders may include orders of unusual size, orders deviating substantially from a normal pattern, and orders of unusual frequency. Failure to do so may result in fines and/or loss of privilege to ship such substances.

Typically, drug distributors institute a simple, threshold-based calculation to determine suspicious orders. For example, a customer may be assigned a monthly threshold for each family of controlled substances and if the customer attempts to place an order that exceeds its monthly threshold, the order is flagged as suspicious.

However, this threshold approach simply sets a number (e.g., threshold) based on various factors and does not automatically adjust over time as more orders are received from customers. Further, this threshold approach does not consider other customers who may be placing orders for controlled substances within the same family. As a result, a customer's threshold may not be as accurate with regard to a "typical" customer who places orders for controlled substances in the same family. In addition, a customer threshold may become outdated (e.g., "stale") over time and not representative of what should be used to flag suspicious orders. As a consequence, the distributor's system may miss orders that should be flagged as suspicious and this may leave the distributor open to possible fines and/or loss of privilege to distribute such substances. Therefore, a need exists for an improved system and method for identifying suspicious orders for a customer in which the system and method automatically account for historical order information for the customer as well as historical order information for other customers.

BRIEF SUMMARY OF VARIOUS EMBODIMENTS OF THE INVENTION

A system for identifying suspicious orders received for controlled substances according to various embodiments includes memory and one or more processors. In particular embodiments, the one or more processors are collectively configured to: (1) receive an order for a controlled substance from a customer, the order including an order quantity, an order date, a customer identifier identifying the customer, a customer type identifier identifying a type of customer, and a substance identifier identifying the controlled substance; (2) query historical orders from the memory including a historical substance identifier that matches the substance identifier, each historical order including a historical quantity, a ship date identifying the date the order was shipped, a historical customer identifier identifying a customer who placed the order, and a historical customer type identifier identifying the type of customer; (3) apply checks to the order; and (4) in response to the order being marked as suspicious, store information associated with the order in the memory to facilitate further investigation.

Further, in various embodiments, the checks include: (1) determining whether the order quantity is greater than a first upper control limit value, the first upper control limit value being derived from the historical quantities for a first subset of the historical orders, the first subset of the historical orders including the historical orders with the historical customer identifiers that match the customer identifier, and in response to the order quantity being greater than the first upper control limit value, marking the order as suspicious; (2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders including the historical orders with the historical customer identifiers that match the customer identifier, and in response to the order quantity being greater than the second upper control limit value, marking the order as suspicious; (3) determining whether the order quantity is greater than a first threshold value, the first threshold value being derived from the historical quantities for a third subset of the historical orders, the third subset of the historical orders including the historical orders with the historical customer type identifiers that match the customer type identifier, and in response to the order quantity being greater than the first threshold value, marking the order as suspicious; and (4) determining whether the order quantity is greater than a second threshold value, the second threshold value being derived from the historical quantities of the historical orders, and in response to the order quantity being greater than the second threshold value, marking the order as suspicious.

In particular embodiments, the one or more processors are further collectively configured to prevent the order from being processed in response to the order being marked as suspicious. In addition, in particular embodiments, the one or more processors are further collectively configured to display a result of the checks on a display device in communication with the processor in response to the order being marked as suspicious.

In various embodiments, the first upper control limit is derived from an exponentially-weighted moving average control chart based on the historical quantities for the first subset of the historical orders sorted by the ship date. Further, in particular embodiments, the second upper control limit is derived from the period of time and a control chart based on the formula Q=D*N and the historical quantities for the second subset. In these particular embodiments, Q is a replenishment order quantity, D is an average daily ship quantity, and N is a period of time since a previous consecutive historical order with the historical customer identifier that matches the customer identifier was shipped. In these particular embodiments, the y-axis of the control chart includes values corresponding to D, and the x-axis of the control chart includes values corresponding to N. In addition, in various embodiments, the substance identifier is a Drug Enforcement Administration (DEA) drug code, the customer identifier is a Drug Enforcement Administration (DEA) customer identifier, and/or the customer type is defined by Drug Enforcement Administration (DEA) registration.

A computer-implemented method for identifying suspicious orders received for controlled substances according to various embodiments includes the steps of: (1) receiving an order for a controlled substance from a customer, the order including an order quantity, an order date, a customer identifier identifying the customer, a customer type identifier identifying a type of customer, and a substance identifier identifying the controlled substance; (2) querying historical orders from memory including a historical substance identifier that matches the substance identifier, each historical order including a historical quantity, a ship date identifying the date the order was shipped, a historical customer identifier identifying a customer who placed the order, and a historical customer type identifier identifying the type of customer; (3) applying checks to the order via a computer device; and (4) in response to the order being marked as suspicious, storing information associated with the order in the memory to facilitate further investigation.

In particular embodiments, the checks include: (1) the computer device determining whether the order quantity is greater than a first upper control limit value, the first upper control limit value being derived from the historical quantities for a first subset of the historical orders, the first subset of the historical orders including the historical orders with the historical customer identifiers that match the customer identifier, and in response to the order quantity being greater than the first upper control limit value, marking the order as suspicious; (2) the computer device calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders including the historical orders with the historical customer identifiers that match the customer identifier, and in response to the order quantity being greater than the second upper control limit value, marking the order as suspicious; (3) the computer device determining whether the order quantity is greater than a first threshold value, the first threshold value being derived from the historical quantities for a third subset of the historical orders, the third subset of the historical orders including the historical orders with the historical customer type identifiers that match the customer type identifier, and in response to the order quantity being greater than the first threshold value, marking the order as suspicious; and (4) the computer device determining whether the order quantity is greater than a second threshold value, the second threshold value is derived from the historical quantities of the historical orders, and in response to the order quantity being greater than the second threshold value, marking the order as suspicious.

Finally, A computer-readable medium according to various embodiments includes code executable by a processor to: (1) receive an order for a controlled substance from a customer, the order including an order quantity, an order date, a customer identifier identifying the customer, a customer type identifier identifying a type of customer, and a substance identifier identifying the controlled substance; (2) query historical orders including a historical substance identifier that matches the substance identifier, each historical order including a historical quantity, a ship date identifying the date the order was shipped, a historical customer identifier identifying a customer who placed the order, and a historical customer type identifier identifying the type of customer; (3) apply checks to the order; and (4) in response to the order being marked as suspicious, store information associated with the order in the memory to facilitate further investigation.

In particular embodiments, the checks include: (1) determining whether the order quantity is greater than a first upper control limit value, the first upper control limit value being derived from the historical quantities for a first subset of the historical orders, the first subset of the historical orders including the historical orders with the historical customer identifiers that match the customer identifier, and in response to the order quantity being greater than the first upper control limit value, marking the order as suspicious; (2) calculating a period of time between the order date for the order and the ship date for a previous consecutive historical order from the historical orders with the historical customer identifier that matches the customer identifier, determining whether the order quantity is greater than a second upper control limit value, the second upper control limit value being derived from the period of time and the historical quantities for a second subset of the historical orders, the second subset of the historical orders including the historical orders with the historical customer identifiers that match the customer identifier, and in response to the order quantity being greater than the second upper control limit value, marking the order as suspicious; (3) determining whether the order quantity is greater than a first threshold value, the first threshold value being derived from the historical quantities for a third subset of the historical orders, the third subset of the historical orders including the historical orders with the historical customer type identifiers that match the customer type identifier, and in response to the order quantity being greater than the first threshold value, marking the order as suspicious; and (4) determining whether the order quantity is greater than a second threshold value, the second threshold value is derived from the historical quantities of the historical orders, and in response to the order quantity being greater than the second threshold value, marking the order as suspicious.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

Figure 1:
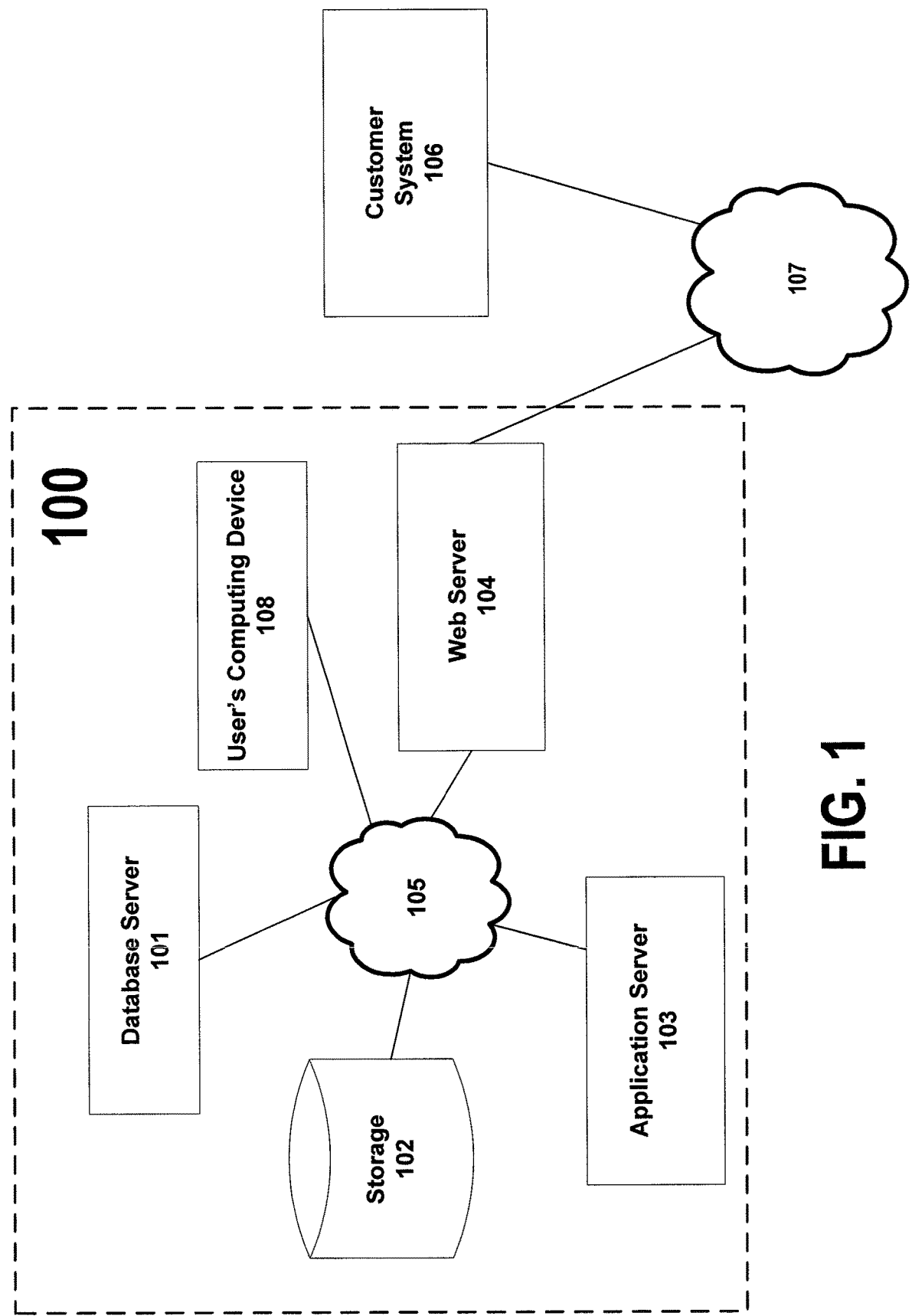
FIG. 1 shows an overview of one embodiment of a system that can be used to practice aspects of the present invention.

Various embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system 100 that can be used in conjunction with various embodiments of the present invention. According to various embodiments, the system 100 may be an order system associated with a manufacturer and/or distributor of controlled substances. In other embodiments, the system 100 may be a shipping system of a carrier used by the manufacturer and/or distributor of controlled substances to ship controlled substances to customers. For instance, a manufacturer may contract with a carrier (such as United Parcel Service) to serve as a warehousing facility and/or distribution facility for the manufacturer. In this particular instance, the carrier may store the manufacturer's inventory of controlled substances, may receive orders from customers for controlled substances, may process the orders, and may ship portions of the inventory to the customers to fulfill the orders.

In FIG. 1, the system 100 may include a collection of servers that provide web services, database operations, and applications used to process orders received for controlled substances. For instance, the system 100 in FIG. 1 includes a database server 101, storage media 102, a web server 104, and an application server 103. In various embodiments, the database server 101 may include a database management system and the storage media 102 may include one or more databases and one or more database instances. In various embodiments, the storage media 102 may be one or more types of medium such as hard disks, magnetic tapes, or flash memory. The term "database" refers to a structured collection of records or data that is stored in a computer system, such as via a relational database, hierarchical database, or network database. For example, in one embodiment, the storage media 102 includes a database that stores historical information on orders received and shipped for controlled substances.

In various embodiments, the web server 104 provides web services to various customers who may place orders for controlled substances as well as users who review information on orders to determine whether the orders have been identified as suspicious. For instance, the web server 104 delivers web pages to browsers as well as other data files to web-based applications. Thus, in various embodiments, the web server 104 includes the hardware, operating system, web server software, TCP/IP protocols, and site content (web pages, images and other files). Thus, in various embodiments, a customer may access one or more web pages delivered by the web server 104 and may place an order for a controlled substance with the system 100. Further, in various embodiments, a user may access one or more web pages to review information on orders that have been reviewed to determine whether the orders are suspicious.

In the embodiment displayed in FIG. 1, the web server 104 communicates over a network 107 (such as the Internet) with a customer's system 106. The customer's system 106 may interface with the web server 104 using a browser residing on devices such as a desktop computer, notebook or laptop, personal digital assistant (PDA), cell phone, or other processing devices. In addition, in various embodiments, the web server 104 communicates over a network 105 within the system 100 (or over an external network 107) with a user's computing device 108. Similar to the customer's system 106, the user's computing device 108 (e.g., a desktop computer, notebook or laptop, personal digital assistant (PDA), cell phone, or other processing devices) may interface with the web server 104 using a browser residing on the user's computing device 108.

Further, in various embodiments, the application server 103 includes applications that are used to provide functionality within the system 100. For instance, in one embodiment, the application server 103 includes a check module. In this particular embodiment, the check module provides functionality to identify suspicious orders placed for controlled substances. In addition, these servers 101, 103, 104 and storage media 102 may also be in electronic communication with one another within the system 100. For instance, these servers 101, 103, 104 and storage media 102 may be in communication over the same or different wireless or wired networks 105 including, for example, a wired or wireless Personal Area Network ("PAN"), Local Area Network ("LAN"), Metropolitan Area Network ("MAN"), Wide Area Network ("WAN"), the Internet, or the like. Finally, while FIG. 1 illustrates the components of the system 100 as separate, standalone entities, the various embodiments of the system 100 are not limited to this particular architecture.

a. Application Server

Figure 2:
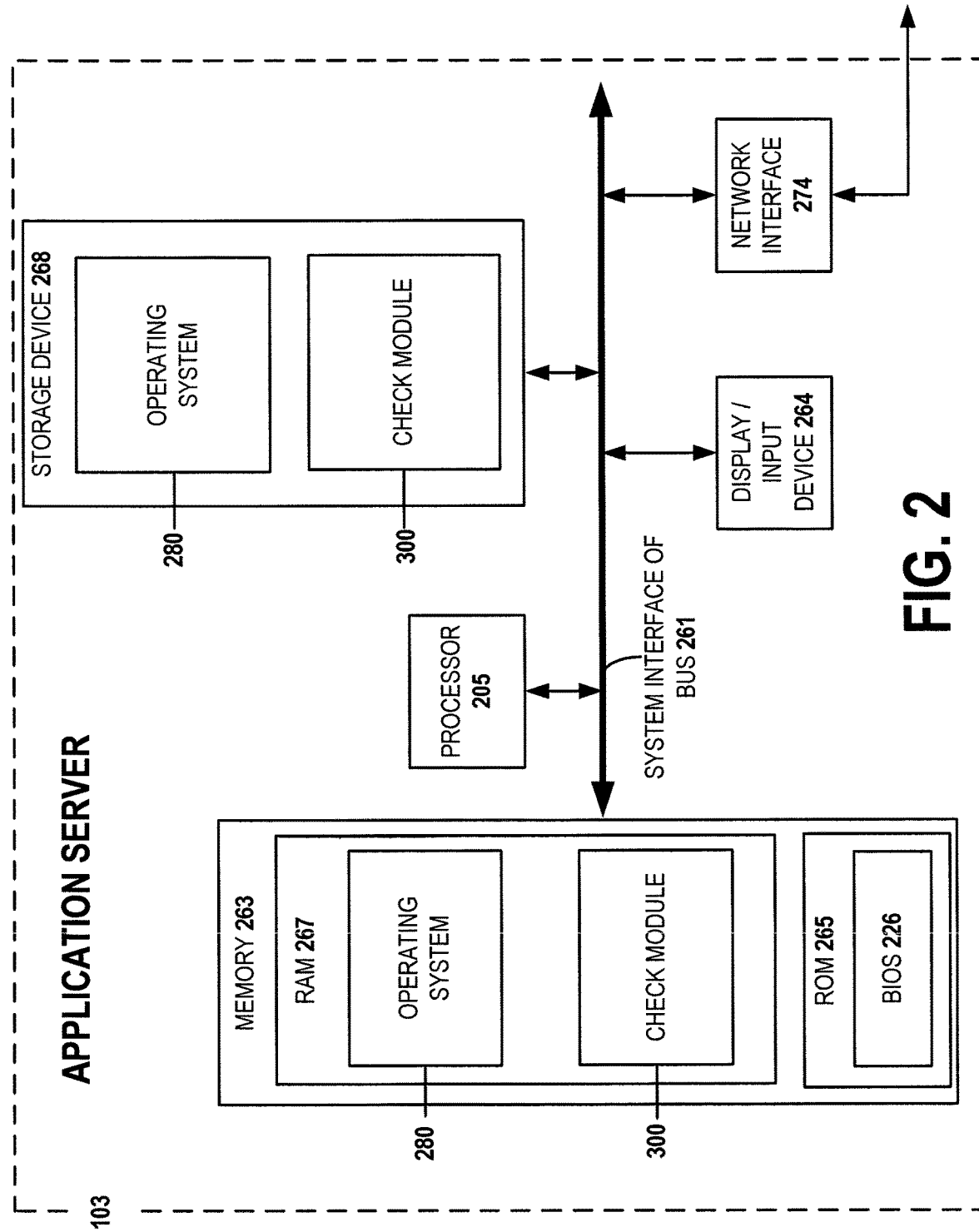
FIG. 2 shows an exemplary schematic diagram of an application server according to one embodiment of the invention.

FIG. 2 provides a schematic of an application server 103 according to one embodiment of the present invention. As will be understood from this figure, in this embodiment, the application server 103 includes a processor 205 that communicates with other elements within the application server 103 via a system interface or bus 261. The processor 205 may be embodied in a number of different ways. For example, the processor 205 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention while configured accordingly. A display device/input device 264 for receiving and displaying data is also included in the application server 103. This display device/input device 264 may be, for example, a keyboard or pointing device that is used in combination with a monitor. The application server 103 further includes memory 263, which may include both read only memory ("ROM") 265 and random access memory ("RAM") 267. The application server's ROM 265 may be used to store a basic input/output system ("BIOS") 226 containing the basic routines that help to transfer information to the different elements within the application server 103.

In addition, in one embodiment, the application server 103 includes at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 268 may be connected to the system bus 261 by an appropriate interface.

Furthermore, a number of program modules (e.g., set of computer program instructions) may be stored by the various storage devices 268 and/or within RAM 267. Such program modules may include an operating system 280 and a check module 300. This module 300 may control certain aspects of the operation of the application server 103 with the assistance of the processor 205 and operating system 280, although its functionality need not be modularized.

Also located within the application server 103, in one embodiment, is a network interface 274 for interfacing with various computing entities, such as the web server 104, database server 101, and/or storage media 102. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the application server 103 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the application server's 103 components may be located remotely from other application server 103 components. Furthermore, one or more of the components may be combined and additional components performing functions described herein may be included in the application server 103.

b. Additional Exemplary System Components

The database server 101 and the web server 104 may each include components and functionality similar to that of the application server 103. For example, in one embodiment, each of these entities may include: (1) a processor that communicates with other elements via a system interface or bus; (2) a display device/input device; (3) memory including both ROM and RAM; (4) a storage device; and (5) a network interface. Thus, these architectures are provided for exemplary purposes only and are not limiting to the various embodiments. The terms "computing device" and "computer device" are used generically to refer to any computer, computing device, desktop, notebook or laptop, distributed system, server, gateway, switch, or other processing device adapted to perform the functions described herein.

III. Exemplary System Operation

Figure 3:
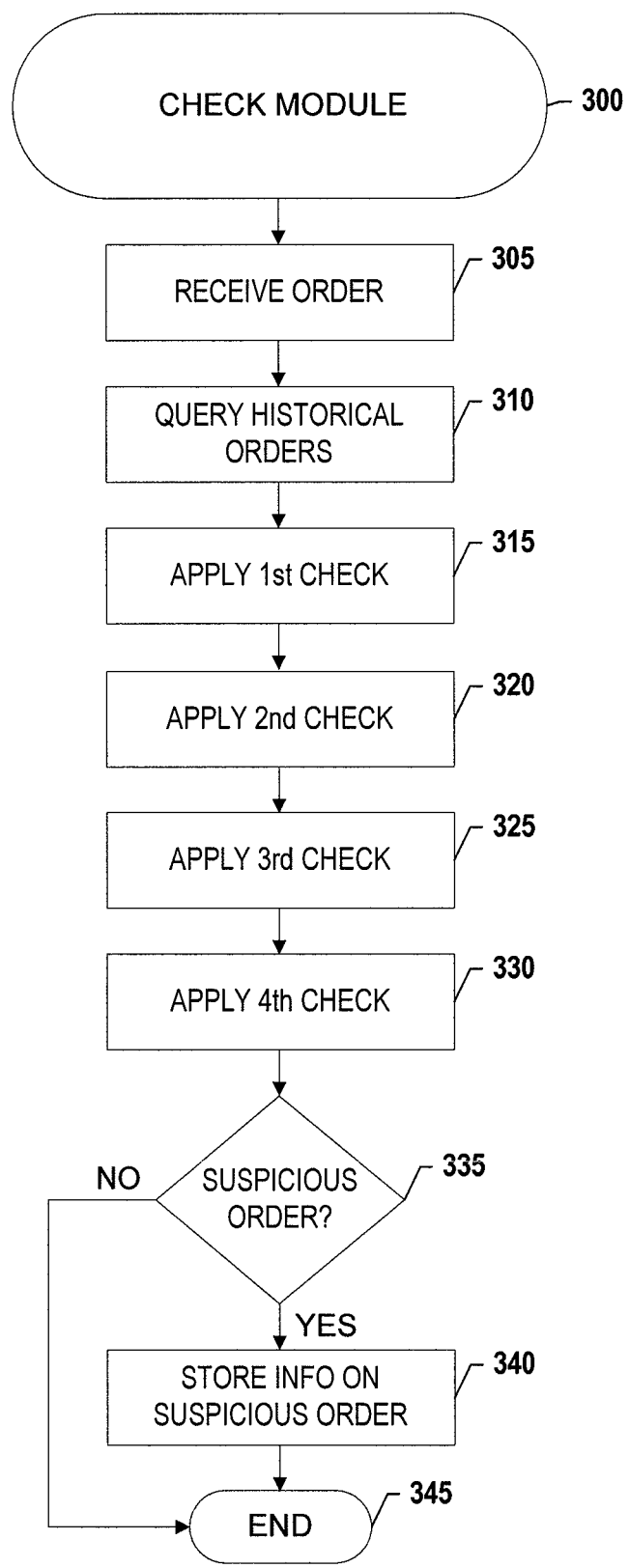
FIG. 3 shows a flow diagram of a check module according to one embodiment of the invention.
Figure 4:
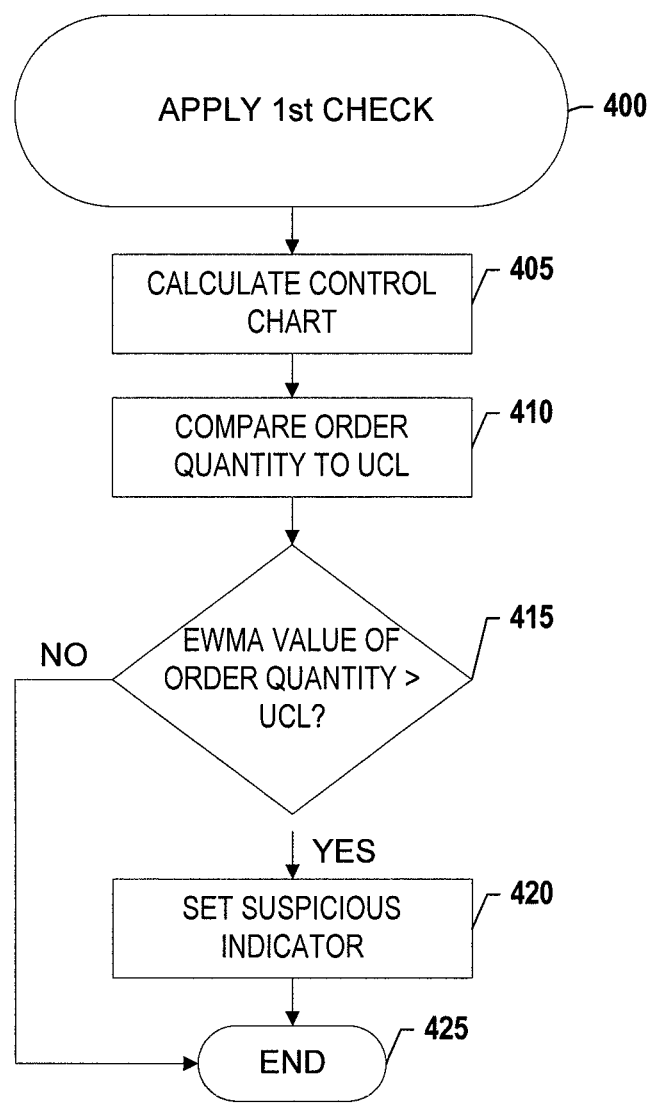
FIG. 4 shows a flow diagram of the check module applying a first check according to one embodiment of the invention.
Figure 5:
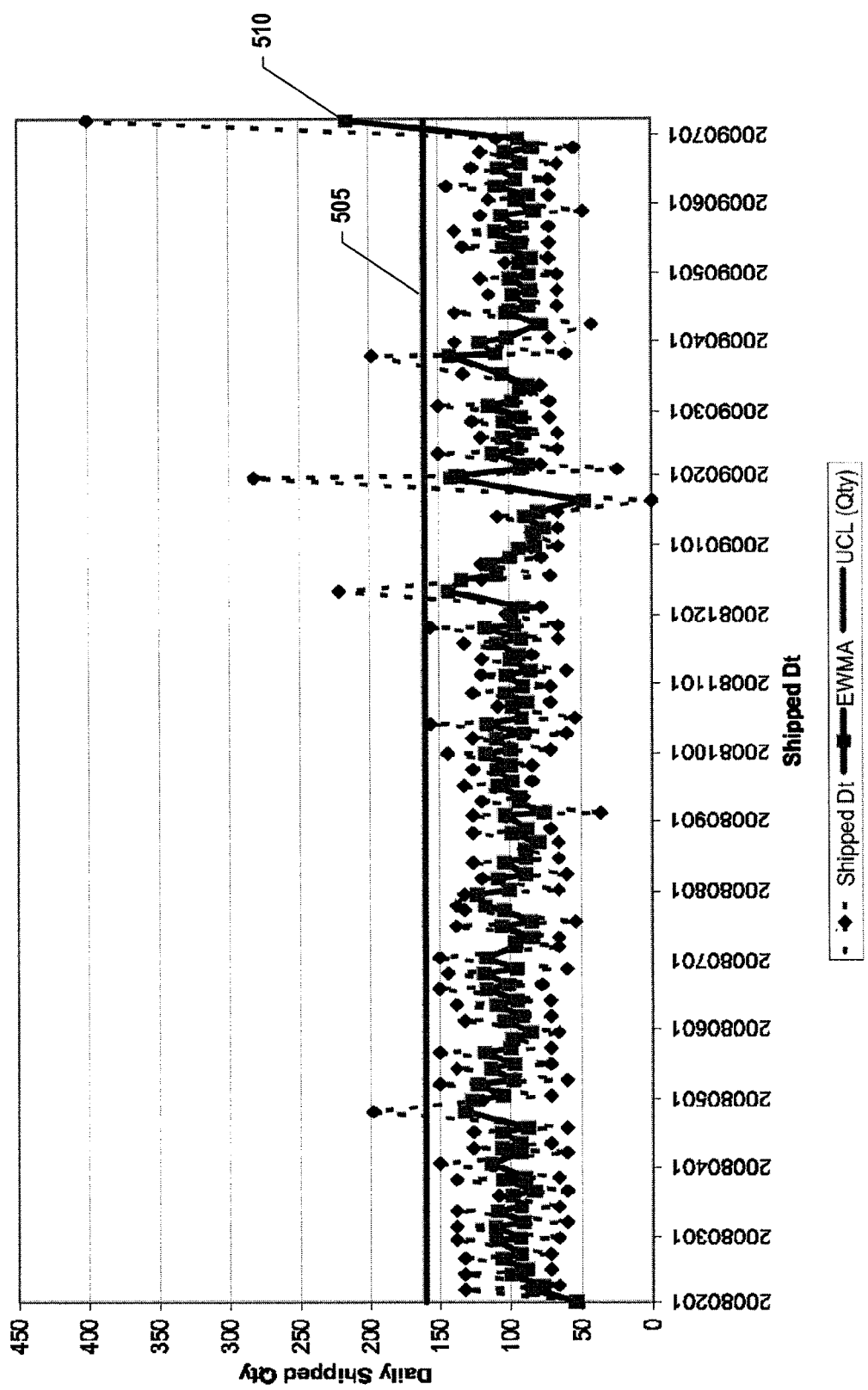
FIG. 5 shows a schematic diagram of an example of an exponentially-weighted moving average control chart used in the first check according to one embodiment of the invention.
Figure 6:
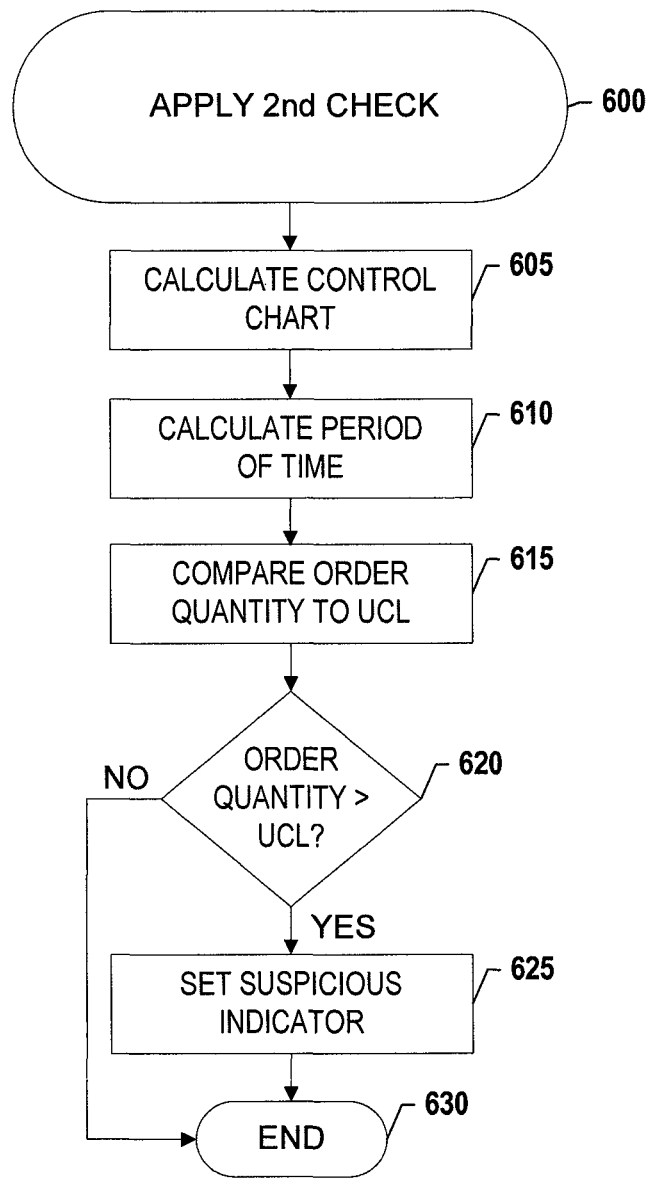
FIG. 6 shows a flow diagram of the check module applying a second check according to one embodiment of the invention.

As noted above, various embodiments of the present invention provide systems and methods for identifying suspicious orders for controlled substances. Reference will now be made to FIGS. 3-8 which illustrate operations and processes as produced by these various embodiments. For instance, FIG. 3 provides a flow diagram of a check module 300 that performs checks on an order received for a controlled substance to determine whether the order should be identified as suspicious. That is, in various embodiments, the check module 300 performs checks on the order to identify the order as an "order of interest" that may be further investigated and deemed to be suspicious. FIG. 4 provides a flow diagram of applying a first check on the order to determine whether the order should be identified as suspicious according to various embodiments. FIG. 6 provides a flow diagram of applying a second check on the order to determine whether the order should be identified as suspicious according to various embodiments. Further, FIG. 8 provides a flow diagram of applying a third check on the order to determine whether the order should be identified as suspicious according to various embodiments. The module 300 and corresponding checks are described in greater detail below.

a. Check Module

As previously discussed, in various embodiments, the application server 103 may include a check module 300 that is adapted to perform checks on an order received for a controlled substance to determine whether the order should be identified as suspicious. As previously described, a distributor may receive the order for the controlled substance in various ways according to embodiments. For instance, in one embodiment, the distributor's system 100 may be in direct communication with the customer's system. For example, the customer may send the distributor an email or the customer's system and the distributor's system 100 may exchange information via electronic data exchange (EDI) over a closed network.

In another embodiment, the customer may enter the order on a web site. In this particular embodiment, the customer visits the web site over the Internet 107 and enters the order via one or more web pages. That is, in various embodiments, a web server 104 located within the distributor's system 100 provides an interface (e.g., one or more web pages) that is configured to allow the customer to enter the order for a controlled substance.

The customer placing the order may provide several pieces of information according to embodiments. For example, the customer may provide an identifier for the controlled substance, such as a Drug Enforcement Administration (DEA) drug code. The customer may provide an identifier that identifies the customer, such as a DEA customer identifier. Further, the customer may provide the order quantity for the controlled substance, the date of placing the order, and other related information such as the customer's shipping address. One of ordinary skill in the art can envision several pieces of information the customer may provide with the order in light of this disclosure.

As a result, the order is received within the distributor's system 100 and the system 100 begins to process the order for fulfillment. In various embodiments, the distributor's system 100 engages the check module 300 to perform checks on the order to determine whether the order should be identified as suspicious. Thus, in particular embodiments, the distributor's system 100 passes the order to the check module 300 residing on the application server 103 depicted in FIG. 1.

Accordingly, FIG. 3 illustrates a flow diagram of the check module 300 according to various embodiments. This flow diagram may correspond to the steps carried out by the processor 205 in the application server 103 shown in FIG. 2 as it executes the module 300 in the server's RAM memory 367 according to various embodiments.

Thus, in Step 305, the check module 300 receives the order and associated information. In Step 310, the check module 300 queries historical information on previous orders for the controlled substance. For instance, in one embodiment, the distributor's system 100 includes storage media 102 that may include one or more databases that stores information on previous orders placed for controlled substances. Therefore, in this embodiment, the check module 300 queries the information from these databases using various information received with the order as search parameters. For example, the check module 300 queries the shipped date, the sum of the shipped quantities shipped for the date, and the number of shipments for the date based on the controlled substance (e.g., based on the identifier for the controlled substance). Further, in various embodiments, the records may be grouped according to ship date, customer, and/or customer type. In this example, the query may aggregate all of the multiple daily shipments for the controlled substance into one single daily shipped quantity.

In various embodiments, the historical information on previous orders is stored in real-time. The reason for this is because in certain instances the distributor may ship a controlled substance for a particular order to a customer on a given day and may ship and/or receive another order for the same controlled substance on the same day. Therefore, the historical information must be up-to-date so that the aggregate order quantity is accurate.

Once the check module 300 has queried all of the information, in Step 315, the check module 300 applies the first check to the order. As is described in further detail below, in various embodiments, the first check involves the check module 300 comparing the order quantity for the order received by the customer with the order quantity history for the customer for the particular controlled substance. If the check module 300 determines the order fails the first check, the check module 300 sets a suspicious order indicator for the order. For instance, in one embodiment, the check module 300 sets the suspicious order indicator to "Y" as a result of the order failing the first check.

Likewise, in Step 320, the check module 300 applies the second check to the order. In various embodiments, the second check involves the check module 300 comparing the order quantity for the order received by the customer and the days since the last order was shipped to the customer for the same controlled substance with the order quantity history and the days between orders for the particular customer and controlled substance. It should be appreciated that the period of time may be measured in different units besides days for various embodiments. For instance, in other embodiments, the check module 300 may compare the number of hours, minutes, or months since the last order was shipped to the customer for the same controlled substance.

If the check module 300 determines the order fails the second check, the check module 300 sets a suspicious order indicator similar to the instance in which the order fails the first check. In one embodiment, the check module 300 sets the same suspicious order indicator as in the case of the first check. However, in another embodiment, the check module 300 sets a different suspicious order indicator. In this particular embodiment, each check has an independent suspicious order indicator that is set as a result of the check module 300 determining that the order fails the particular check. Accordingly, the distributor is able to determine from the individual suspicious order indicators which checks a particular order has failed.

In Step 325, the check module 300 applies the third check to the order. In various embodiments, the third check involves the check module 300 comparing the order quantity for the order received by the customer with order quantity history for orders received by customers of the same type for the controlled substance. In particular embodiments, the customer type for a customer is identified by the DEA registration for the customer. If the check module 300 determines the order fails the third check, the check module 300 sets a suspicious order indicator. As previous described, the suspicious order indicator may be the same indicator associated with the first and second checks or the indicator may be independent and associated only with the third check.

In Step 330, the check module 300 applies the fourth check to the order. In various embodiments, the fourth check involves the check module 300 comparing the order quantity for the order received by the customer with order quantity history for any customer for the particular controlled substance. If the check module 300 determines the order fails the fourth check, the check module 300 sets a suspicious order indicator. As previously described, the suspicious order indicator may be the same indicator associated with the first, second, and third checks or the indicator may be independent and associated only with the fourth check.

Once the check module 300 has performed the four checks, in Step 335, the check module 300 determines whether the order should be identified as suspicious. In various embodiments, this involves the check module 300 evaluating the suspicious order indicator(s). Thus, in Step 340, if the check module 300 determines that the lone indicator or one or more of the individual indicators have been set as a result of the order failing a particular check, the check module 300 stores information indicating that the order has been identified as suspicious in memory.

For instance, in one embodiment, the check module 300 simply stores information on the order in local memory residing in the application server 103 depicted in FIG. 2 (e.g., the storage device 268 residing in the application server 103). In another embodiment, the check module 300 stores the information in some type of storage media. For example, the storage media 102 shown in the distributor's system 100 depicted in FIG. 1. While in another embodiment, the check module 300 stores the information in some type of storage media that is external to the distributor's system 100.

Further, the information stored by the check module 300 may include different types of information according to various embodiments. For instance, in one embodiment, the check module 300 simply stores the suspicious order indicator(s). While in another embodiment, as described below, the check module 300 stores information in addition to the suspicious order indicator(s) related to the check(s) performed by the check module 300.

It should be noted that in various embodiments the check module 300 may be configured to determine whether the order has failed a particular check immediately after the check has been performed. That is, in these particular embodiments, the check module 300 may be configured to determine whether the order has failed the first check immediately after performing the first check and before performing the second check. If the order has failed the first check and the order has been identified as suspicious, the check module 300 may be configured to stored information on the suspicious order and not perform the remaining checks (e.g., the second, third, and fourth checks). The check module 300 may be configured to perform the second, third, and fourth check in the same way. As a result, in various embodiments, the check module 300 may execute more quickly than in instances in which the check module 300 is configured to perform all four checks regardless of whether the order fails one of the checks.

Provided below is more detail on how the check module 300 performs the four checks according to various embodiments of the invention. The additional detail is provided along with an example to better demonstrate the check module 300 performing these checks. Thus, the example is provided for illustrative purposes only and should not be construed to limit the scope of the invention.

b. First Check

As described above, in various embodiments, the check module 300 is configured to apply a first check to the order received by the customer to determine whether the order should be identified as suspicious. In particular embodiments, this may entail the check module 300 comparing the order quantity for the order received by the customer with the order quantity history for the customer for the particular controlled substance. Accordingly, FIG. 4 illustrates a flow diagram of the check module 300 performing the first check according to various embodiments.

For example, a customer enters an order for four-hundred (400) units of the muscle relaxant Clonazepam. In the order, the Clonazepam is identified by its DEA drug code of 2737 and the customer is identified by its DEA identifier of ZZ12345678. Further, the order identifies a date of Jul. 7, 2009 as the order date.

As previous mentioned, the check module 300 receives the information on the order and queries the historical information on previous orders based on one or more parameters identified in the order information. For instance, in the example, the check module 300 queries the historical information to retrieve a sum of the shipped quantity and the number of shipments for each ship date wherein the queried records are based on the DEA drug code for each record being 2737 (e.g., Clonazepam) and the customer identifier being ZZ12345678. Thus, the check module 300 queries the order quantity history for orders of Clonazepam received from and shipped to the customer.

It should be noted that the unit of measure for quantity may vary from order to order in particular embodiments. For instance, the unit of measure for quantity may be each (EA), grams (GM), and/or milliliter (ML). Therefore, in these particular embodiments, the unit of measure may also be used as a parameter in querying records from the historical information.

Once the check module 300 has queried the historical information, the check module 300 performs the first check. In various embodiments, the check module 300 makes use of one or more control charts for this check (e.g., data associated with control charts). A control chart is a tool used in statistical quality control to determine if a process is operating within a specified range, or is "in control." In this case, "in control" implies that the order quantity is typical when compared to past orders. In particular embodiments, the check module 300 is configured to plot the order quantity by order date and use an exponentially-weighted moving average (EWMA) chart to determine whether the order quantity stays within confidence limits based on past order history. The EWMA chart is used in these particular embodiments because the chart can adapt to small and gradual drifts in the order quantity but identify large and quick changes.

Further, in various embodiments, two parameters are defined prior to the check module 300 creating the EWMA control chart. The first parameter is an update parameter. In various embodiments, this parameter is set to a value between zero (0) and one (1) and indicates how much weight is given to the current value and how much weight is given to the previous EWMA. Values closer to one (1) direct the algorithm to weight the current order quantity more heavily and give less weight to older orders, causing the EWMA to adapt more quickly to changes. In particular embodiments, a default value of 0.4 is used.

The second parameter is a sigma multiplier for an upper control limit. This parameter controls the confidence level of the chart. A default value of 3.0 indicates that the control limit should be set such that 99.7% of the order quantities following a normal distribution will be within the limit. Lowering the value to 1.96 will reduce the percentage to 95%. Thus, in various embodiments, the tradeoff of lowering the value is identifying more "false positives" versus possibly missing a suspicious order with a higher value of sigma.

Therefore, in various embodiments, the check module 300 calculates the EWMA chart based on the historical order quantities and the order quantity for the order received by the customer, shown as Step 405. In particular embodiments, the EWMA chart is sorted by shipped date. In addition, in particular embodiments, the check module 300 calculates the standard deviation and determines the upper control limit (UCL) for the EWMA chart.

Thus, in Step 410, the check module 300 compares the EWMA value for the order quantity for the order received from the customer with the upper control limit. In Step 415, the check module 300 determines whether the EWMA value for the order quantity is greater than the upper control limit. If the check module 300 determines the EWMA value for the order quantity is greater than the upper control limit, the check module 300 sets the suspicious order indicator for the order, shown as Step 420.

Therefore, returning to the example, the check module 300 calculates the EWMA chart for the historical order quantities and the order quantity for the order received by the customer and determines that the upper control limit for the chart is 159.8 units. The chart is shown in FIG. 5 and the upper control limit 505 is shown as the straight line above the individual data points. The EWMA value for the order quantity for the order received by the customer is represented as the last data point 510 shown in the timeline. As can be seen, the data point 510 for the order quantity for the order is above the upper control limit 505. That is, the EWMA value of the order quantity of 400 is greater than the upper control limit of 159.8. Thus, the check module 300 determines that the EWMA value of the order quantity is greater than the upper control limit, and as a result the module 300 sets the suspicious order indictor for the order.

c. Second Check

Further, in various embodiments, the check module 300 is configured to apply a second check to the order received by the customer to determine whether the order should be identified as suspicious. In particular embodiments, this may entail the check module 300 comparing the order quantity for the order received by the customer and the days since the last order was shipped to the customer for the same controlled substance with the order quantity history and the days between orders for the particular customer and controlled substance. Accordingly, FIG. 6 illustrates a flow diagram of the check module 300 performing the second check according to various embodiments.

In various embodiments, the check module 300 factors in a period of time (e.g., number of days) since the last order was shipped for the controlled substance and the order quantity on the last order to determine an order rate that is typical and then compares the order with respect to the order rate. For instance, in one embodiment, the check module 300 uses the equation Q=D*N to define a line in which replenishment orders received from the customer for the controlled substance should fall close to. (In the equation Q=D*N, Q is the replenishment order quantity, D is the average daily ship rate (e.g., the average daily ship quantity), and N is the time period (e.g., number of days) since the last replenishment order was placed.) With the use of this equation, the variability is expected to increase as the time period between orders gets larger in various embodiments. As a result, the upper control limit for a control chart based on the equation is a function of both quantity and time.

Thus, in Step 605, the check module 300 calculates a control chart based on the queried historical information on previous orders received from the customer for the controlled substance. For instance, in one particular embodiment, the control chart includes an x-axis of time period between consecutive orders (e.g., number of days between consecutive orders) and a y-axis of daily shipped quantity.

Further, in Step 610, the check module 300 calculates the period of time since the last order was shipped for the customer for the controlled substance. The check module 300 then compares the order quantity to the upper control limit for the corresponding time period on the x-axis of the control chart, shown as Step 615. In Step 620, the check module 300 determines whether the order quantity is greater than the upper control limit that corresponds to the calculated period of time. If the check module 300 determines that the order quantity is greater than the upper control limit, the check module 300 sets the suspicious order indicator for the order, shown as Step 625.

Figure 7:
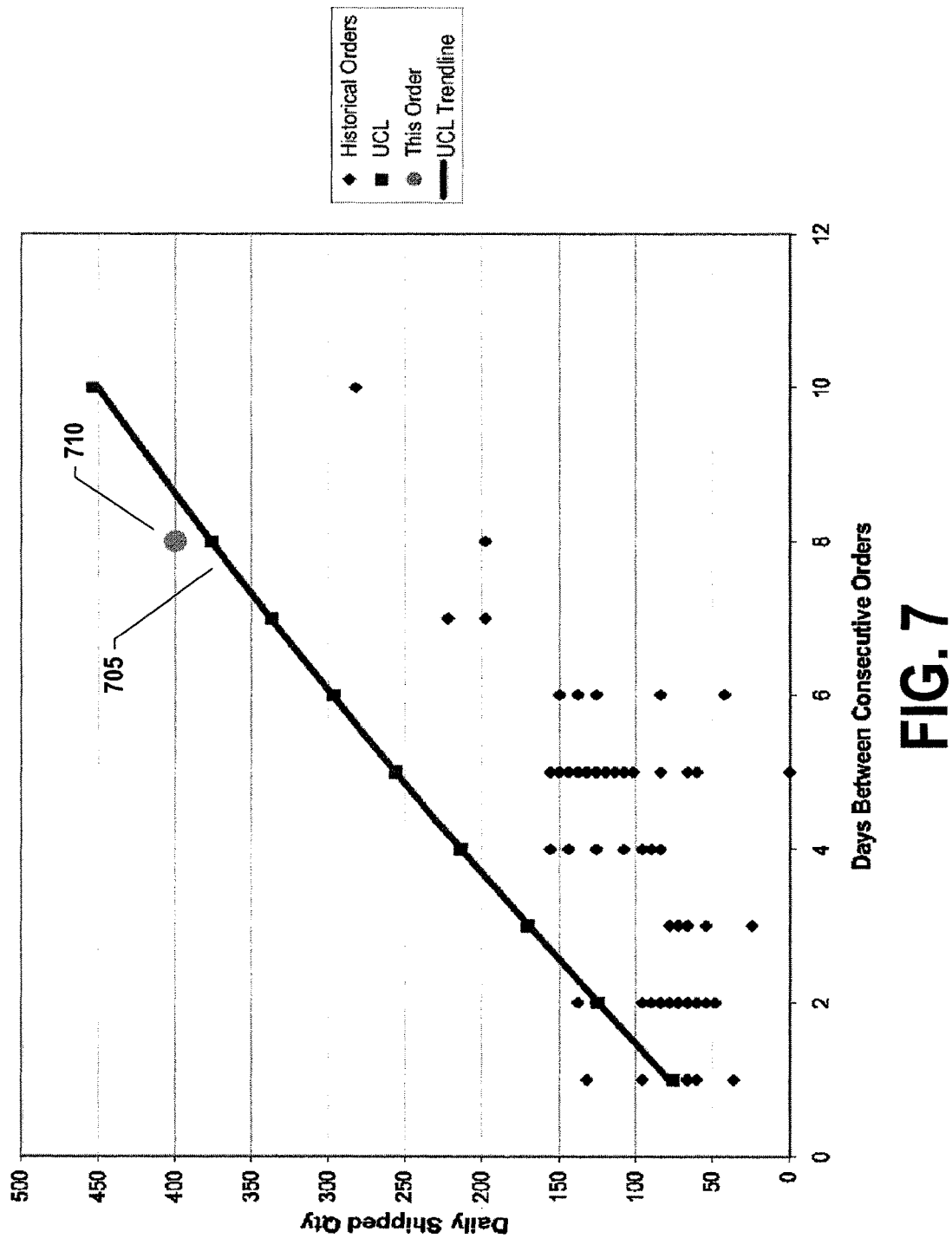
FIG. 7 shows a schematic diagram of an example of a daily rate control chart used in the second check according to one embodiment of the invention.
Figure 8:
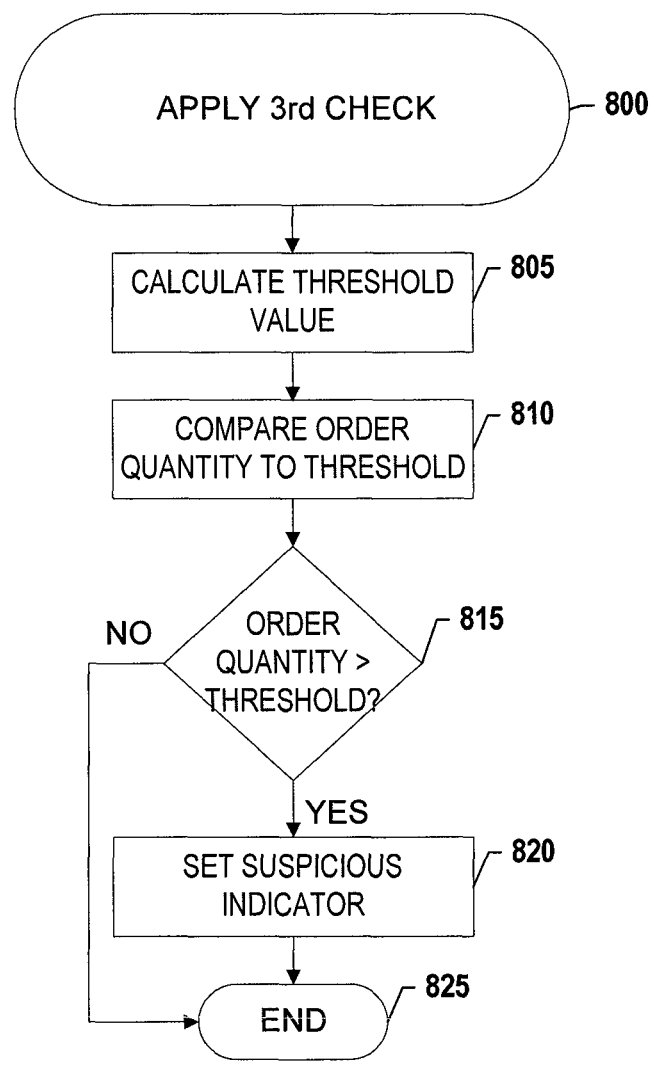
FIG. 8 shows a flow diagram of the check module applying a third check according to one embodiment of the invention.

Thus, returning to the example, the check module 300 calculates the control chart depicted in FIG. 7 based on the historical information. Further, the check module 300 calculates that is has been eight days since the previous order of Clonazepam was shipped to the customer. Therefore, the check module 300 determines whether the order quantity for the order of Clonazepam is greater than the upper control limit 705 that corresponds to eight days on the x-axis of the control chart. In this case, the order quantity 710 of 400 units is greater than the upper control limit 705 of 376 units. As a result, the check module 300 sets the suspicious order indicator for the order.

d. Third Check

As previously mentioned, in various embodiments, the check module 300 is also configured to apply a third check to the order received by the customer to determine whether the order should be identified as suspicious. In particular embodiments, this may entail the check module 300 comparing the order quantity for the order received by the customer with order quantity history for orders received by customers of the same type for the controlled substance. Accordingly, FIG. 8 illustrates a flow diagram of the check module 300 performing the third check according to various embodiments.

As mentioned, in various embodiments, the check module 300 queries historical information of previous orders for the controlled substance. Further, as mentioned, in various embodiments, the queried record may be grouped by customer type. In particular embodiments, the customer type may be the customer type assigned by the DEA. Thus, in these particular embodiments, the check module 300 retrieves the records from the historical information with the same identifier for the controlled substance and the same customer type as the customer who placed the order. That is, the check module 300 may retrieve the records from the records originally queried from the historical information (e.g., a subset of the queried records) or the check module 300 may query the historical information directly for the records.

In Step 805, the check module 300 begins the process for applying the third check by calculating a threshold value based on the queried historical information to compare to the order quantity received on the order for the controlled substance. For instance, in various embodiments, the check module 300 simply sets the threshold value to a percentage of the historical order quantities that the order quantity for the order received must fall under. For example, the threshold value may be set to 95% and therefore the order quantity must be within the order quantities of 95% of the historical orders received and shipped for the controlled substance for the customer type. Yet, in other embodiments, the check module 300 calculates a threshold value based on using either a common or a specialized probability distribution model for the historical quantities for the customer type. For example, the check module 300 uses a normal distribution and sets the threshold value to the ninety-fifth percentile (e.g., two standard deviations of the mean).

Following the calculation, the check module 300 compares the order quantity on the order received from the customer with the threshold value, in Step 810. In Step 815, the check module 300 determines whether the order quantity is greater than the threshold value. In Step 820, if the check module 300 determines the order quantity is greater than the threshold value, the check module 300 sets the suspicious order indicator for the order.

Thus, returning to the example, the customer type for the customer who has placed the order is "Retail Pharmacy." The check module 300 retrieves four-hundred and fifty-nine records for historical orders shipped for the controlled substance Clonazepam to customers with the customer type of "Retail Pharmacy." The check module 300 sets the threshold value to 95%, evaluates the historical order quantities for Clonazepam, and determines the order quantity received for the order by the customer of 400 is higher than 98% of the historical order quantities for customers of the same type. As a result, the check module 300 sets the suspicious order indicator for the order.

d. Fourth Check

Further, in various embodiments, the check module 300 is configured to apply a fourth check to the order received by the customer to determine whether the order should be identified as suspicious. In particular embodiments, this may entail the check module 300 comparing the order quantity for the order received by the customer with order quantity history for any customer for the particular controlled substance. Thus, the check module 300 basically performs the same steps as the third check with a different set of retrieved historical records. In this particular instance, the check module 300 does not limit the retrieved records to the same customer type as the customer who placed the order. The check module 300 retrieves records for all of the historical orders placed and shipped for the controlled substance.

Similar to the third check, the check module 300 sets a threshold value and determines whether the order quantity for the order received from the customer is greater than the threshold. In various embodiments, the check module 300 sets the threshold using similar mechanisms as described above with respect to the third check. Therefore, returning to the example, the check module 300 retrieves three-thousand nine-hundred and seventeen historical records for orders received and shipped for Clonazepam. The check module 300 sets the threshold value to 95%, evaluates the historical order quantities for Clonazepam, and determines the order quantity received for the order by the customer of 400 is higher than 86% of the historical order quantities for all customers. As a result, the check module 300 does not set the suspicious order indicator for the order.

III. Exemplary Interfaces

As previously described, in various embodiments, the check module 300 stores information, in addition to the suspicious order indicators, related to the checks performed by the check module 300. Further, in various embodiments, the distributor's system 100 may include an interface that displays the results of the checks. In particular embodiments, this interface may be provided by the check module 300 and is accessed via a user interacting directly with the check module 300. For example, a user may interact with the check module 300 over a network 105 within the distributor's system 100 and the check module 300 provides one or more screens that serve as an interface. While in other embodiments, the interface may be provided as one or more web pages via the web server 104. For instance, in these particular embodiments, the web server 104 may communication with the check module 300 residing on the application server 103 and/or the storage 102 over the network 105 and may provide one or more web pages to display information gathered from the check module 300 and/or storage 102 on the checks performed by the check module 300. Thus, a user logs onto a web site associated with the distributor via a browser on the user's computing device 108 and interacts with the interface via the one or more web pages.

Figure 9:
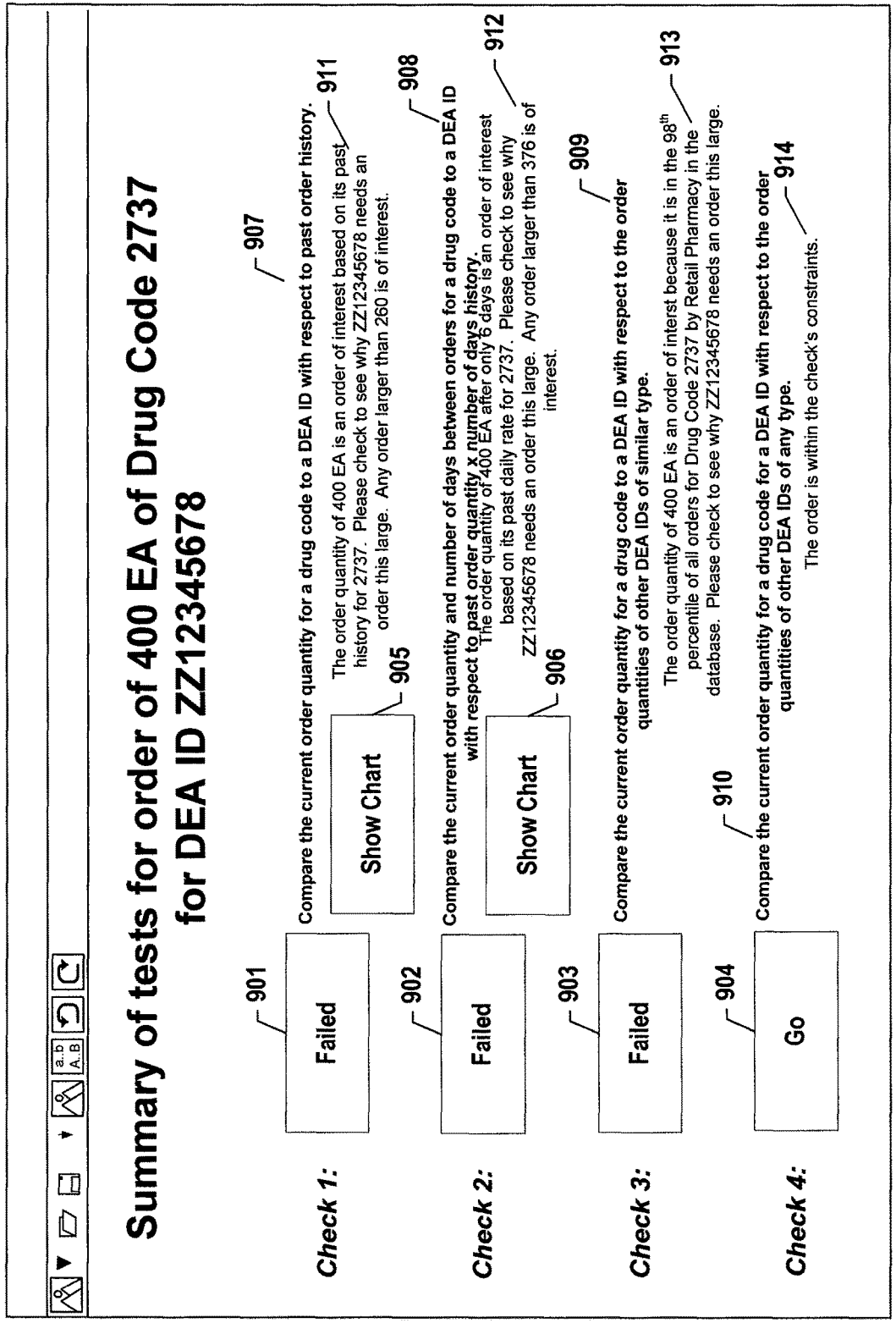
FIG. 9 shows a schematic diagram of a display of the results of evaluating an order according to one embodiment of the invention.

Shown in FIG. 9 is an example of an embodiment of an interface that presents the results of the checks performed on the order received from customer ZZ12345678 for 400 units of Clonazepam (e.g., drug code 2737). The interface displays the results of each check performed for the order 901, 902, 903, 904. For instance, the interface displays that the order has failed checks one, two, and three. In addition, the interface provides selection mechanisms 905, 906 (e.g., buttons) that allow a user to view the control charts associated with the first check and the second check. Further, the interface provides a description of each check 907, 908, 909, 910 and the results of each check along with instructions based on the results 911, 912, 913, 914.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A distributor system for identifying suspicious orders received for controlled substances, the distributor system comprising:

memory; and one or more processors collectively configured to:

receive, via network interface and by the one or more processors executing a check module, an order for a controlled substance from a customer computing device, the order comprising an order quantity, an order date, a customer identifier identifying the customer, a customer type identifier identifying a type of customer, and a substance identifier identifying the controlled substance;

query, via the network interface and by the one or more processors executing the check module, historical orders from a relational database comprising a historical substance identifier that matches the substance identifier, each historical order comprising a historical quantity, a ship date identifying the date the historical order was shipped, a historical customer identifier identifying a customer who placed the order, and a historical customer type identifier identifying the type of customer;

generating an update parameter by weighting the order and each historical order based on a time that the order and each historical order was received;

generating a sigma multiplier for an upper control limit to set a confidence level interval;

based at least in part on the weighting and the sigma multiplier, generating an Exponentially-weighted Moving Average (EWMA) control chart;

generating a EWMA value for the order;

based at least in part on the EWMA control chart, automatically flag, by the one or more processors executing the check module, the order as suspicious according to two or more of the following three thresholds:

(1) the EWMA value of the order quantity is greater than a first threshold that is outside of the upper control limit, wherein the first threshold is determined based on a period of time between the order date and the ship date for a previous consecutive historical order from the historical orders with the historical customer identifier matching the customer identifier and the historical quantities for a first subset of the historical orders comprising the historical orders with the historical customer identifiers that match the customer identifier;

(2) the EWMA value of the order quantity is greater than a second threshold that is outside of the upper control limit, wherein the second threshold is based on the historical quantities for a second subset of historical order comprising the historical orders with the historical customer type identifier matching the customer type identifier; and (3) the EWMA value of the order quantity is greater than a third threshold that is outside of the upper control limit, wherein the third threshold is based on the historical quantities of the historical orders;

in response to the order being marked as suspicious, transmit information associated with the order to an investigating computing device for further investigation;

based at least in part on the marking, automatically generate a user interface that indicates whether the one or more thresholds have been met, a first user interface element being user-selectable and being configured to provide a first description associated with a first threshold, of the two or more thresholds, a second user interface element being user-selectable; and in response receiving an indication of a selection of the second user interface element, causing a modification of the user interface by causing presentation of the EWMA control chart.

2. The system of claim 1, wherein two of the three thresholds are applied.

3. The system of claim 1, wherein each of the three thresholds are applied.

4. The system of claim 1, wherein:

the order is marked suspicious based on a fourth threshold; and the fourth threshold is derived from the exponentially-weighted moving average control chart based on the historical quantities for a fourth subset of the historical orders sorted by the ship date, the fourth subset of the historical orders comprising the historical orders with the historical customer identifiers that match the customer identifier, wherein the exponentially-weighted moving average control chart is created based on the update parameter that indicates a first weight for EWMA value associated with an exponentially-weighted moving average and a second weight for a previous EWMA value associated with the exponentially-weighted moving average, and is created based on the sigma multiplier parameter for the fourth threshold that indicates the confidence level interval of the exponentially-weighted moving average control chart.

5. The system of claim 4, wherein the order is marked as suspicious based on at least one and no more than two of any of the first, second, and the third threshold.

6. The system of claim 1, wherein the first threshold is further derived from the period of time and the EWMA control chart based on the formula Q=D*N and the historical quantities for the second subset, Q comprises a replenishment order quantity, D comprises an average daily ship quantity, N comprises a period of time since a previous consecutive historical order with the historical customer identifier that matches the customer identifier was shipped, a y-axis of the control chart comprises values corresponding to D, and an x-axis of the control chart comprises values corresponding to N.

7. The system of claim 6, wherein the order is marked as suspicious based on at least the first threshold, and wherein the transmitting of information associated with the order to a user interface associated with an investigating computing device for further investigation occurs to determine whether there is at least one of: a fine and a loss privilege to complete the order for the controlled substance.

8. The system of claim 1, wherein at least one of the substance identifier, the customer identifier, and the customer type is a Drug Enforcement Administration (DEA) customer identifier.

9. A computer-implemented method for identifying suspicious orders received for controlled substances, the method comprising:

receiving, by one or more processors executing a check module, an order for a controlled substance from a customer, the order comprising an order quantity, an order date, a customer identifier identifying the customer, a customer type identifier identifying a type of customer, and a substance identifier identifying the controlled substance;

querying, by one or more processors executing the check module, historical orders from the memory comprising a historical substance identifier that matches the substance identifier, each historical order comprising a historical quantity, a ship date identifying the date the historical order was shipped, a historical customer identifier identifying a customer who placed the order, and a historical customer type identifier identifying the type of customer;

generating an update parameter by weighting the order and each historical order based on a time that the order and each historical order was received;

generating a sigma multiplier for an upper control limit to set a confidence level interval;

based at least in part on the weighting and the sigma multiplier, generating an Exponentially-weighted Moving Average (EWMA) control chart;

generating a EWMA value for the order;

based on the EWMA control chart, marking, by the one or more processors executing the check module, the order as suspicious based at least in part on one or more of the following four thresholds:

(1) the EWMA value for the order quantity is greater than a first threshold associated with the upper control limit, wherein the first threshold is determined based on a period of time between the order date and the ship date for a previous consecutive historical order from the historical orders with the historical customer identifier matching the customer identifier and the historical quantities for a first subset of the historical orders comprising the historical orders with the historical customer identifiers that match the customer identifier;

(2) the EWMA value for the order quantity is greater than a second threshold associated with the upper control limit, wherein the second threshold is based on the historical quantities for a second subset of historical order comprising the historical orders with the historical customer type identifier matching the customer type identifier;

(3) the EWMA value of the order quantity is greater than a third threshold associated with the upper control limit, wherein the third threshold is based on the historical quantities of the historical orders;

(4) the EWMA value of the order quantity is greater than a fourth threshold associated with the upper control limit, the fourth threshold is derived from an exponentially-weighted moving average control chart based on the historical quantities for a first subset of the historical orders sorted by the ship date, wherein the fourth subset of the historical orders comprise the historical orders with the historical customer identifiers that match the customer identifier; and in response to the order being marked as suspicious, automatically generating a user interface that indicates whether the two or more thresholds have been met, a first user interface element being user-selectable and at least partially being configured to provide a first description associated with a first threshold, of the two or more thresholds.

10. The method of claim 9, wherein the order is marked suspicious based on any two of the following: the first threshold, the second threshold, and the third threshold.

11. The method of claim 9, wherein the order is marked suspicious based on one and no more than two of any of the first threshold, the second threshold, the third threshold, and the fourth threshold.

12. The method of claim 9, wherein the first threshold is further derived from the period of time and the EWMA control chart based on the formula Q=D*N and the historical quantities for the second subset, Q comprises a replenishment order quantity, D comprises an average daily ship quantity, N comprises a period of time since a previous consecutive historical order with the historical customer identifier that matches the customer identifier was shipped, a y-axis of the EWMA control chart comprises values corresponding to D, and an x-axis of the EWMA control chart comprises values corresponding to N.

13. The method of claim 9, wherein the order is marked as suspicious based on at least the first threshold.

14. The method of claim 9, wherein at least one of the substance identifier, the customer identifier, and the customer type is a Drug Enforcement Administration (DEA) customer identifier.

15. The method of claim 9, further comprising the step of preventing the order from being processed in response to the order being marked as suspicious.

16. A non-transitory computer-readable medium comprising code executable by a processor to:

receive, over a network and at a distributor system, an order for a controlled substance from a customer, the order comprising an order quantity, an order date, a customer identifier identifying the customer, a customer type identifier identifying a type of customer, and a substance identifier identifying the controlled substance;

query historical orders from the memory comprising a historical substance identifier that matches the substance identifier, each historical order comprising a historical quantity, a ship date identifying the date the historical order was shipped, a historical customer identifier identifying a customer who placed the order, and a historical customer type identifier identifying the type of customer;

generating an update parameter by weighting the order and each historical order based on a time that the order and each historical order was received;

generating a sigma multiplier for an upper control limit to set a confidence level interval;

based at least in part on the weighting and the sigma multiplier, generating an Exponentially-weighted Moving Average (EWMA) control chart;

based on the EWMA control chart, mark the order as suspicious based on one or more of the following four thresholds:

(1) the order quantity is greater than a first threshold associated with the upper control limit, wherein the first threshold is determined based on a period of time between the order date and the ship date for a previous consecutive historical order from the historical orders with the historical customer identifier matching the customer identifier and the historical quantities for a first subset of the historical orders comprising the historical orders with the historical customer identifiers that match the customer identifier;

(2) the order quantity is greater than a second threshold associated with the upper control limit, wherein the second threshold is based on the historical quantities for a second subset of historical order comprising the historical orders with the historical customer type identifier matching the customer type identifier;

(3) the order quantity is greater than a third threshold associated with the upper control limit, wherein the third threshold is based on the historical quantities of the historical orders;

(4) the order quantity is greater than a fourth threshold associated with the upper control limit, the fourth threshold is derived from an exponentially-weighted moving average control chart based on the historical quantities for a first subset of the historical orders sorted by the ship date, wherein the fourth subset of the historical orders comprise the historical orders with the historical customer identifiers that match the customer identifier; and in response to the order being marked as suspicious, automatically causing generation of a user interface that indicates whether the one or more thresholds have been met, a first user interface element being user-selectable and being at least partially configured to provide information associated with the one or more thresholds in response to user selection.

17. The computer-readable medium of claim 16, wherein the order is marked suspicious based on any two of the following: the first threshold, the second threshold, and the third threshold.

18. The computer-readable medium of claim 16, wherein the first threshold is further derived from the period of time and EWMA control chart based on the formula Q=D*N and the historical quantities for the second subset, Q comprises a replenishment order quantity, D comprises an average daily ship quantity, N comprises a period of time since a previous consecutive historical order with the historical customer identifier that matches the customer identifier was shipped, a y-axis of the EWMA control chart comprises values corresponding to D, and an x-axis of the EWMA control chart comprises values corresponding to N.

* * * * *